United States Patent [19]

Herbst

[11] 3,717,818
[45] Feb. 20, 1973

[54] INSTANTANEOUS VOLTAGE DETECTOR

[76] Inventor: John A. Herbst, 320 South Street, Morristown, N.J. 07960

[22] Filed: Jan. 10, 1972

[21] Appl. No.: 216,535

[52] U.S. Cl. ..................328/141, 307/232, 307/233, 307/235 R, 328/63, 328/134, 328/146, 328/151
[51] Int. Cl. ........H03k 5/20, H03b 3/08, H03d 13/00
[58] Field of Search......307/232, 233, 235, 242, 243, 307/261, 269; 328/63, 127, 128, 134, 140, 141, 147, 148, 149, 151, 158

[56] References Cited

UNITED STATES PATENTS

| | | | |
|---|---|---|---|
| 3,119,070 | 1/1964 | Seliger | 328/132 X |
| 3,235,800 | 2/1966 | Turrell | 328/141 X |
| 3,474,259 | 10/1969 | Rodgers | 307/235 X |
| 3,543,167 | 11/1970 | Albarda | 307/232 X |
| 3,548,327 | 12/1970 | Vermeulen | 307/232 X |
| 3,549,997 | 12/1970 | Rötzel | 328/141 X |
| 3,553,597 | 1/1971 | Bugay | 328/140 X |

*Primary Examiner*—John S. Heyman
*Assistant Examiner*—L. N. Anagnos
*Attorney*—Philip G. Hilbert

[57] ABSTRACT

An apparatus for indicating the amplitude of an alternating voltage signal including first and second cyclically operating signal integrators which periodically integrate the alternating voltage signal and a reference D.C. signal related to the nominal or desired amplitude of the alternating voltage signal. The integrators operate in synchronism with the alternating voltage signal. The two integrated signals are periodically compared for amplitude and polarity differences. There is also provided means for periodically comparing the integrated alternating voltage signal with another reference D.C. signal representing the nominal or desired frequency thereof to indicate the instantaneous frequency of the alternating voltage signal.

10 Claims, 2 Drawing Figures

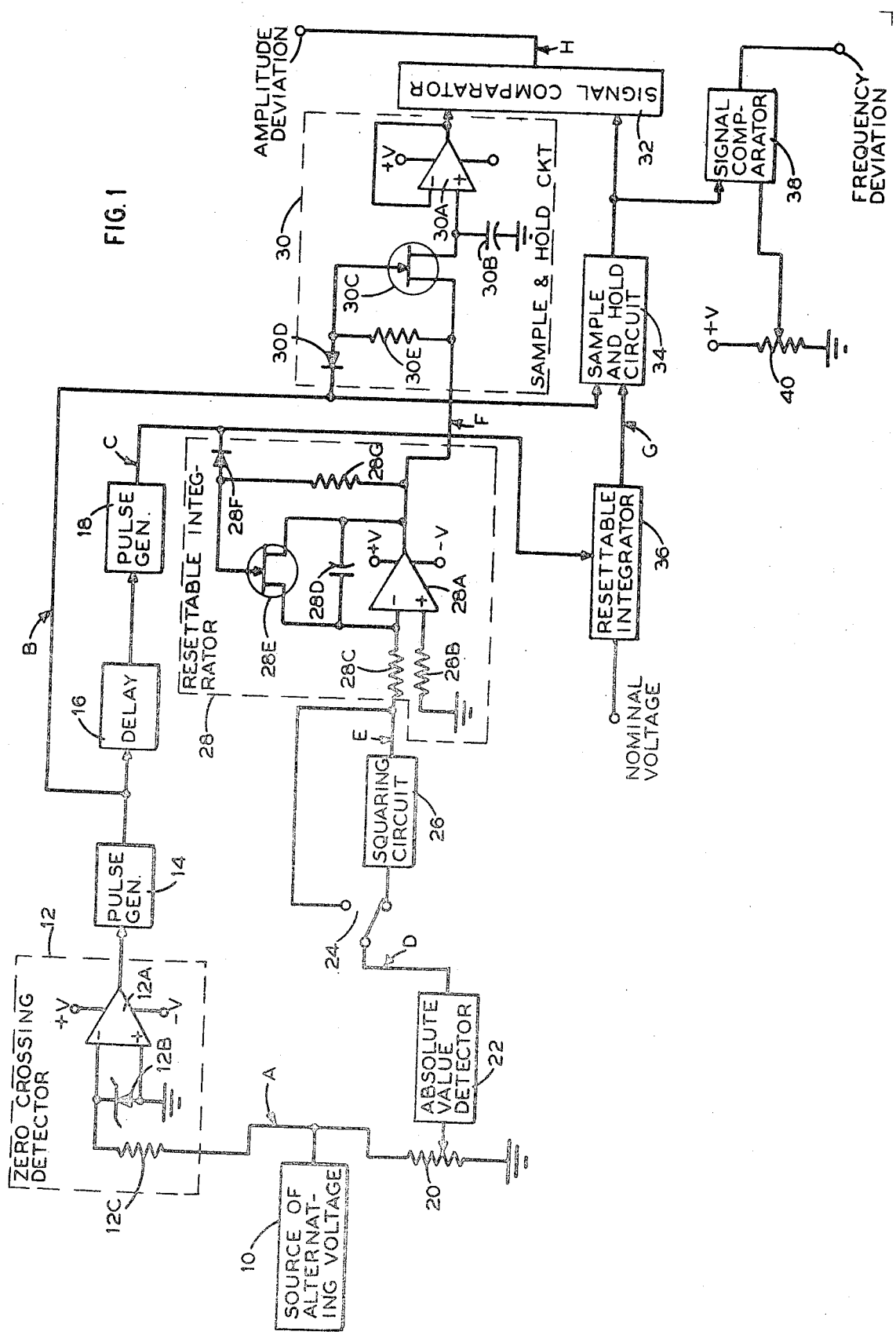

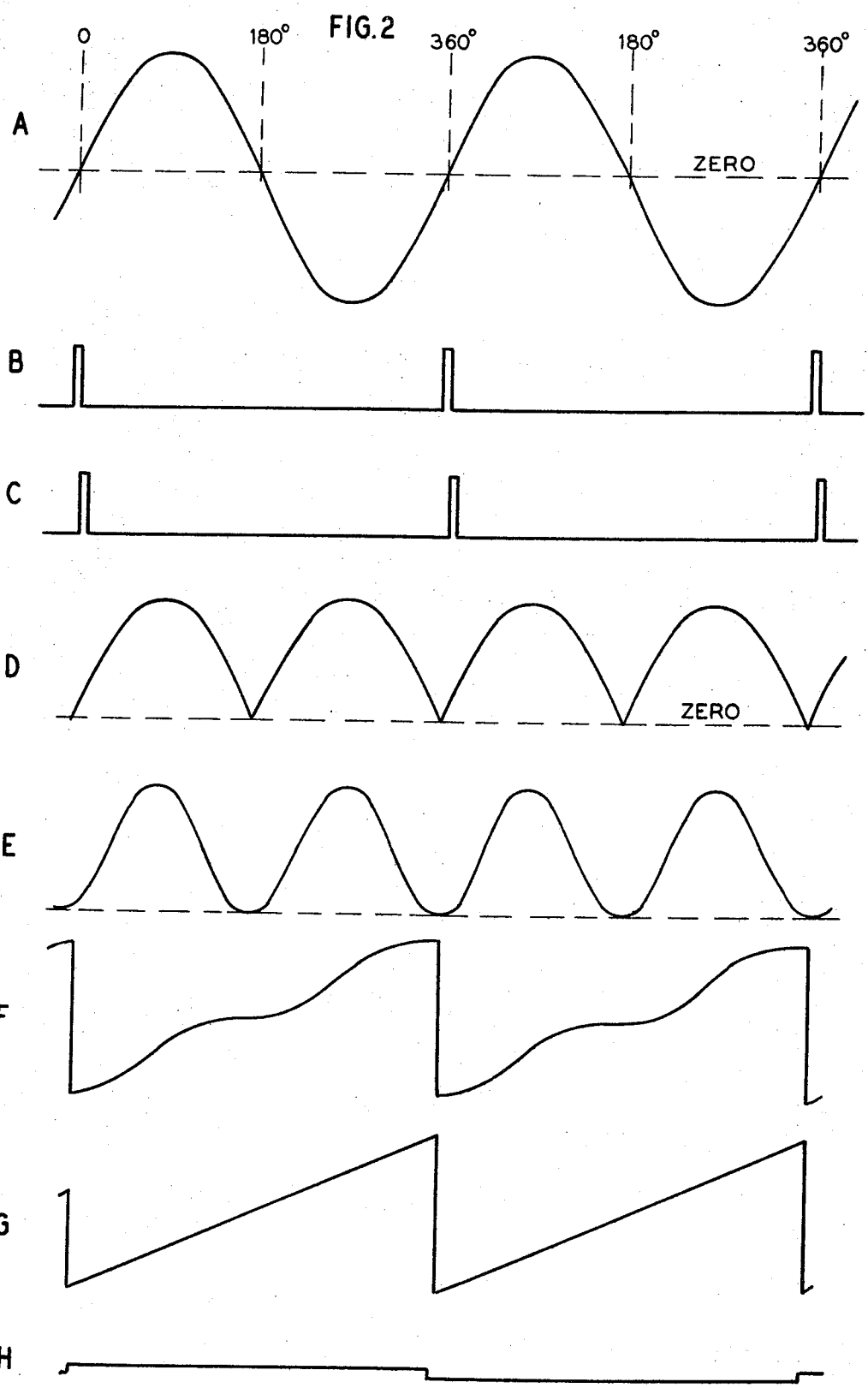

INSTANTANEOUS VOLTAGE DETECTOR

BACKGROUND OF THE INVENTION

This invention pertains to voltage amplitude indicators and more particularly, to indicators of alternating voltages which are frequency independent.

Alternating voltage amplitude indicators have many uses, such as the monitoring of power networks to detect failures, shed leads, transfer, etc. Since power systems are being operated much closer to capacity than previously, prompt detection of overloads to initiate load shedding, is becoming more important. Conventional indicators generally employ a rectifier followed by a low pass filter to produce a D.C. signal which is compared with a reference D.C. signal.

The low pass filter with sufficent attenuation to remove the ripple, is exceedingly slow in response, requiring many cycles to give a true steady state output. In addition, such detectors are frequency sensitive. When the conventional indicators are used in control systems, the long response times introduce servo problems and produce a less than optimum transient response.

It is therefore an object of this invention to provide an improved alternating voltage indicator which is (1) rapid in operation, and (2) insensitive to frequency.

Another object of this invention is to provide an improved alternating voltage indicator which gives a frequency independent representation of the amplitude of the voltage within one cycle interval of the voltage.

These objects are attained by generating a D.C. reference signal having an amplitude related to a nominal value of the alternating voltage signal and providing first and second cyclically operating signal integrators which integrate the reference signal and the alternating voltage signal respectively, in synchronism for a given period during each cycle of the alternating voltage signal.

The integrated signals are periodically compared to generate a signal whose value is related to the deviation of the instantaneous value of the amplitude of the alternating voltage signal from the nominal value.

There is also the need for indicating the amplitude of the alternating voltage signal independent of its frequency while simultaneously indicating the frequency of the alternating voltage signal independent of its amplitude. For example, in motor-generators, such indicators are used to control the motor speed and generator field excitation.

Accordingly, another object of this invention is to provide such an indicator. Therefore, there is added to the indicator of the instant invention, means for generating another D.C. reference signal having an amplitude related to the nominal frequency of the alternating voltage signal and periodically comparing this signal with the integrated alternating voltage signal to generate a signal whose value is related to the deviation of the frequency of the alternating voltage signal from the nominal frequency.

Other objects of this invention will in part be obvious and in part hereinafter pointed out.

DESCRIPTION OF THE DRAWINGS

FIG. 1 is a block diagram, partially in schematic, of the voltage indicator embodying the invention; and FIG. 2 is a diagram of waveforms at particular points in the block diagram of FIG. 1.

DESCRIPTION OF THE PREFERRED EMBODIMENTS

The apparatus of the instant invention will be described with appropriate reference to the block diagram of FIG. 1 and the showing of waveforms in FIG. 2.

The alternating voltage whose amplitude and frequency are to be indicated, is generated by a source 10 which can be a power main, a generator output, or the like. Such voltage is fed via line A to a zero crossing detector generally indicated at 12, which senses positive going passes through zero amplitude to yield a trigger pulse for each such passage.

Detector 12 comprises comparator or difference amplifier 12A having a zener diode 12B across its inputs with the anode thereof connected to ground and the cathode thereof connected via limiting resistor 12C to line A. Each pulse from detector 12 triggers pulse generator 14 to transmit a sample pulse on line B. At the same time each pulse from pulse generator 14 passes through delay 16 to trigger pulse generator 18 which emits a reset pulse on line C in response to each received pulse.

Waveforms A, B and C, as shown in FIG. 2, indicate the timing relationships of the signals on lines A, B and C of FIG. 1. As can be seen, the sample and reset pulses are fixed in phase with respect to the zero crossings and with respect to each other; and cyclically occur in synchronism with the alternating voltage signal.

At the same time, the alternating voltage signal on line A after attenuation by potentiometer 20, is fed to absolute value detector 22 which emits the full wave rectified waveform D of FIG. 2, on line D. Absolute value detector 22 can be a full wave rectifier or the like.

Since RMS amplitude values are to be indicated, line D is connected by switch 24, positioned as shown in FIG. 1, to squaring circuit 26 which is of conventional circuit design. The output of squaring circuit 26 is connected via line E to the input of resettable signal integrator generally indicated at 28, see waveform E in FIG. 2. If average amplitude values are to be indicated, switch 24 is placed in its alternate position and the output of detector 22 is connected directly to the input of resettable signal integrator 28.

Resettable signal integrator 28 is shown comprising operational amplifier 28A whose + input is connected to ground via resistor 28B and whose − input is connected via resistor 28C to line E. Integrating capacitor 28D connects the output of amplifier 28A to the negative input thereof. In shunt with capacitor 28D is the source-drain circuit of FET transistor 28E operating as a switch.

Although the transistor 28E would be normally conductive, diode 28F which connects the gate thereof to pulse generator 18, supplies a turn off voltage to prevent conduction of the transistor. When a pulse is present on line C from pulse generator 18, the turn-off voltage is removed, the transistor conducts heavily and discharges any charge on capacitor 28D. Resistor 28G assists in keeping the transistor in its lowest resistance state. The output of the integrator 28 is connected via line F to the input of sample and hold circuit 30.

Sample and hold circuit 30 comprises operational amplifier 30A whose positive input is connected to one end of hold capacitor 30B and whose negative input is connected to the output thereof, so that amplifier 30A has a very high input impedance. Hold capacitor 30B is connected via the source-drain circuit of FET transistor 30C to line F. The gate of transistor 30C is connected via gating diode 30D to sample line B.

Normally transistor 30C is held non-conductive by diode 30D connected to pulse generator 14, but when a pulse is generated, the turn-off voltage ceases and the transistor conductively connects line F to hold capacitor 30B which stores a representation of the instantaneous amplitude of the signal from integrator 28.

The output of sample and hold circuit 30 is connected to one input of signal amplitude comparator 32. The second input of comparator 32 is connected to the output of sample and hold circuit 34, which is similar in detail to circuit 30, whose sample pulse input is connected via line G to the output of resettable integrator 36.

Resettable signal integrator 36, which is similar to integrator 28, has its input connected to a D.C. reference voltage source whose amplitude is related to the nominal or desired amplitude of the alternating voltage signal.

The operation of integrators 28 and 36; the sample and hold circuits 30 and 34; and signal comparator 32, are apparent from a consideration of waveforms B, C, E, F, G and H, as shown in FIG. 2.

In particular, at the occurrence of a reset pulse on line C, integrators 28 and 36 are cleared. After the pulse terminates, integrator 28 starts integrating the signal on line E (derived from the alternating voltage being monitored) and integrator 36 starts integrating the nominal valued D.C. reference voltage generating the signal on lines F and G respectively.

At the zero crossing at the start of the next cycle of the alternating voltage signal on line A, a sample pulse is generated on line B closing sample and hold circuits 30 and 34 to lines F and G respectively. At the end of the sample pulse, the circuits open and their capacitors store a voltage until the sample pulse of the next cycle. This voltage represents the amplitude of the integrated signals at the time of the sampling, in spite of the fact that the reset pulse on line C following the sample pulse clears the integrators to start a new cycle.

The signals at the outputs of the sample and hold circuits are compared by a subtraction operation by signal comparator 32 which yields a signal on line H whose polarity and amplitude indicates the magnitude and sense of deviation of the amplitude of the alternating voltage signal on line A from a nominal or desired value.

At the same time, the output of sample and hold circuit 34 is also fed to one input of signal comparator 38 whose other input receives a D.C. reference signal from potentiometer 40. The amplitude of this reference signal is chosen to represent the nominal or desired values of the frequency of the alternating voltage signal. Therefore, the output of signal comparator 38 transmits a signal whose polarity and amplitude indicates the magnitude and sense of deviation of the frequency of the alternating voltage signal from a nominal or desired frequency.

I claim:

1. Apparatus for indicating the amplitude of an alternating voltage signal comprising means for providing a D.C. reference signal having an amplitude related to a nominal value of the amplitude of the alternating voltage signal, a first cyclically operating signal integrator means for integrating the alternating voltage signal for a given period of time during each cycle, a second cyclically operating signal integrator means for integrating the D.C. reference signal for a given period of time during each cycle, means for synchronizing the cyclical operation of said first and second signal integrator means and comprising means for periodically comparing the integrated signals from said signal integrator means to generate a signal whose value is related to the deviation of the instantaneous value of the amplitude of the alternating voltage signal from said nominal value, wherein said second signal integrator means cyclically operates at the frequency of the alternating voltage signal.

2. Apparatus as in claim 1 and further comprising means for generating another D.C. reference signal having an amplitude related to the nominal frequency of the alternating voltage signal and another signal comparing means for periodically comparing the integrated signal from said second signal integrator means with the other D.C. reference signal to generate a signal whose value is related to the deviation of the frequency of the alternating voltage signal from said nominal frequency.

3. Apparatus for indicating the amplitude of an alternating voltage signal comprising means for generating a pulse signal during each cycle of the alternating voltage signal when said signal has a particular amplitude value, means for detecting the instantaneous amplitude of the alternating voltage signal, means for providing a D.C. reference signal having an amplitude related to a nominal value of the amplitude of the alternating voltage signal, a first signal integrator means for integrating the instantaneous amplitude of the alternating voltage signal, a second signal integrator means for integrating the D.C. reference signal, said first and second signal integrator means being recycled in response to said pulse signal, signal comparator means operative in response to said pulse signal for comparing instantaneous values of the integrated signals from said signal integrator means at a given instant in each cycle of the alternating voltage signal.

4. Apparatus as in claim 3 wherein said signal comparator means includes signal sample and hold means and a signal amplitude comparator.

5. Apparatus as in claim 3 wherein said signal comparator means comprises first and second signal sample and hold means each triggered to operate in response to said pulse signal, and a signal amplitude comparator, said first signal sample and hold means having an input connected to the output of said first signal integrator means and an output connected to said signal comparator, and said second signal sample and hold means having an input connected to the output of said second signal integrator means and an output connected to said signal comparator.

6. Apparatus as in claim 5 wherein said pulse signal generating means is a zero crossing detector circuit whose output is connected to both said sample and hold means, and a pulse delay means connecting the output of said zero crossing detector circuit to reset inputs of said signal integrator means.

7. Apparatus as in claim 3 and further comprising means for generating another D.C. reference signal having an amplitude related to the nominal frequency of the alternating voltage signal and another signal comparator means for comparing the amplitude of the integrated signal from said second signal integrator means with the amplitude of the other D.C. reference signal.

8. Apparatus as in claim 5 and further comprising means for generating another D.C. reference signal having an amplitude related to the nominal frequency of the alternating voltage signal and a second signal comparator means for comparing the amplitude of the signal from the second signal sample and hold means with the amplitude of the other D.C. reference signal.

9. Apparatus as in claim 8 wherein said pulse signal generating means is a zero crossing detector circuit whose output is connected to both said sample and hold means, and a pulse delay means connecting the output of said zero crossing detector circuit to reset inputs of said signal integrator means.

10. Apparatus as in claim 3 and further comprising means for squaring the alternating voltage signal before integration thereof by said first signal integrator means.

* * * * *